3,032,331
PIPE CLAMP FOR TRIMMING MACHINES
John T. Doty, Reynolds T. Doty, and Pierce E. Doty, all of 9936 E. Ramona Ave., Bellflower, Calif.
Filed May 25, 1959, Ser. No. 815,703
4 Claims. (Cl. 269—34)

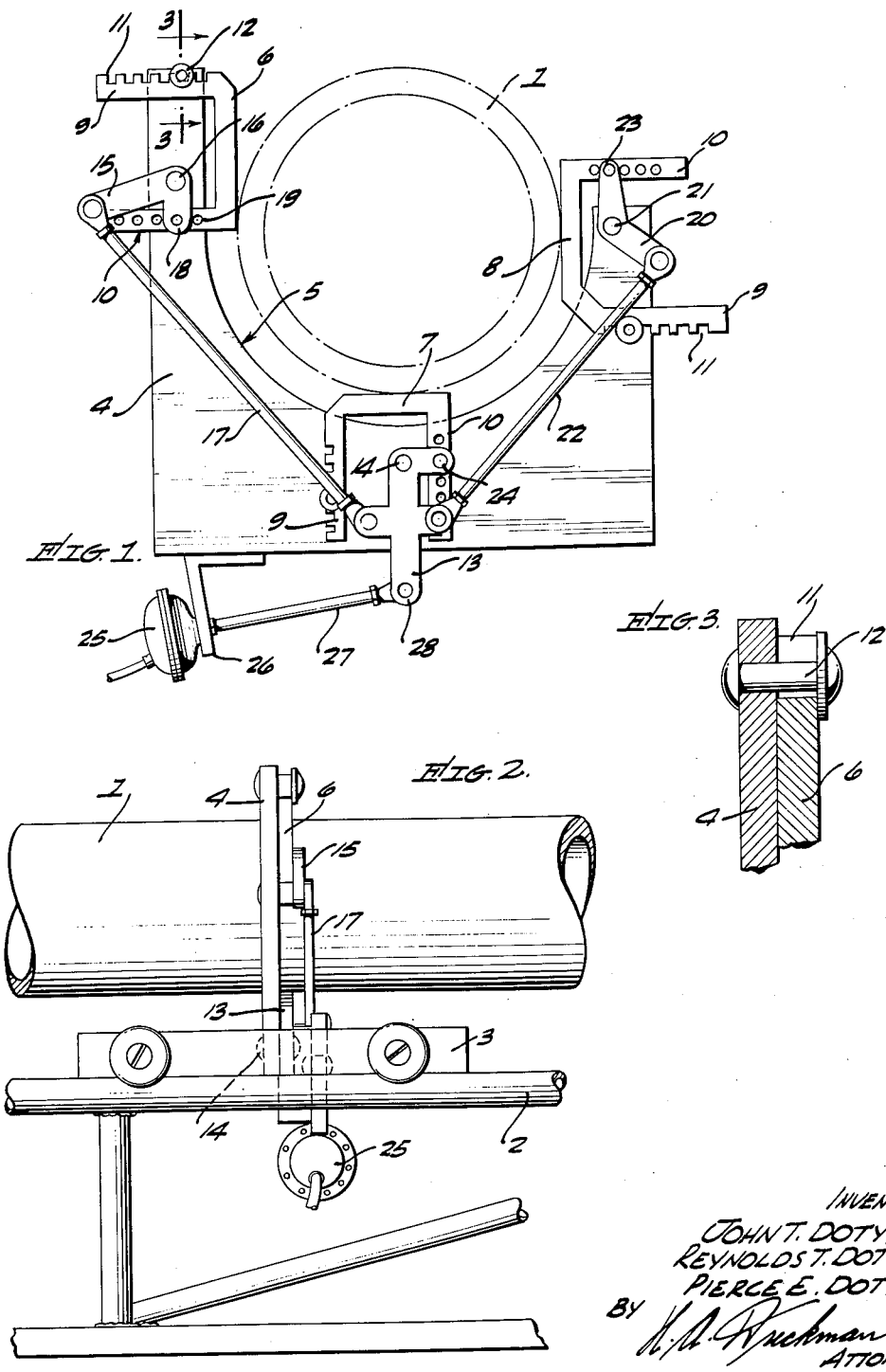

This invention relates to a pipe clamp for trimming machines of the type disclosed in our copending application, Serial No. 790,697, filed February 2, 1959. In pipe cutting and shaping machines of the powered type it is necessary to hold the pipe securely in a carriage or saddle so that the end of the pipe may be trimmed, cut or shaped in an appropriate manner.

An object of this invention, therefore, is to provide a clamping means which will effectively grasp and securely hold the pipe; the clamping means being actuated by appropriate power, such as a hydraulic or pneumatic cylinder or unit. Our pipe clamping means may also be quickly and easily adjusted to fit pipes of different diameters, the adjustment being accomplished by moving the pipe engaging jaws radially as required.

Another object of our invention is to provide a novel clamp for trimming machines of the character stated, in which the pipe engaging jaws may each be adjusted radially by removing appropriate pins which connect the actuating jaw mechanism to the jaw, thus permitting each of the pipe engaging jaws to be moved radially as required to properly hold the pipe.

Other objects, advantages and features of invention may appear from the accompanying drawing, the subjoined detailed description and the appended claims.

In the drawing:

FIGURE 1 is a transverse sectional view of a pipe cutting and shaping machine including our invention.

FIGURE 2 is a fragmentary side elevation of a pipe cutting and shaping machine including our pipe clamping means.

FIGURE 3 is a fragmentary sectional view taken on line 3—3 of FIGURE 1.

Referring more particularly to the drawing, the pipe 1 which is to be worked upon in the machine is supported on an elongated horizontal frame 2, which is preferably formed of structural members or pipe. A carriage 3 is supported or mounted on the frame 2 and this carriage may be either stationary or movable, as required in the particular machine. A supporting plate or saddle 4 is fixedly mounted on the carriage 3 and this plate is formed with an arcuate recess 5 to accommodate the pipe 1. The pipe 1 must be securely mounted on the carriage 3 and within the recess or saddle 5 of the plate 4, and this is accomplished by means of a plurality of inwardly movable jaws to engage the outer surface of the pipe. In this instance we have shown three such jaws and they are constructed, mounted and operated as follows:

The pipe engaging jaws 6, 7 and 8 are mounted on one face of the plate 4, and each of these jaws can be adjusted radially on the plate 4 in a manner to be subsequently described, and each of these jaws are also swung inwardly to engage the outer surface of the pipe 1, as will be described. The jaws 6, 7 and 8 are each substantially U-shaped and each jaw includes a pair of horizontal legs 9 and 10. A plurality of spaced notches 11 are provided in one edge of the legs 9 and these notches are adapted to fit over a pivot bolt 12 which is fixedly mounted in the plate 4 and projects horizontally therefrom. The notches 11 permit each of the jaws to be adjusted radially both inwardly and outwardly for the purpose of engaging pipes 1 of different diameters, and this pin being fixed also serves as a pivot around which each of the jaws 6, 7 and 8 will rock to engage the pipe 1 when actuated by the power mechanism, which will be subsequently described.

A bell crank lever 13 is pivotally mounted on one face of the plate 4 by means of the pivot pin 14. A second bell crank lever 15 is pivotally mounted on the plate 4 by the pin 16 and one arm of this last bell crank lever is connected to the bell crank 13 by the push rod 17. The bell crank 15 is also pivotally attached to the jaw 6 by the pin 18 which enters at one of the spaced holes 19 in the arm 10 of the jaw. A third bell crank 20 is also pivotally mounted on the plate 4 by means of the pin 21, and one arm of this last bell crank is operatively connected to the bell crank 13 by the push rod 22 which connects these bell cranks. The bell crank 20 is also pivotally attached to the arm 10 of the jaw 8 by the pin 23 which enters at one of the spaced holes in the jaw 8. The jaw 7 is similarly coupled to the bell crank 13 by the pin 24 which enters one of the spaced holes in the jaw 7 in the same manner as described for the jaws 6 and 8.

A power cylinder 25 is fixedly mounted in the carriage 3 by means of the bracket 26, and this power cylinder may be either hydraulic or pneumatic as described. A pitman or operating rod 27 extends from the power cylinder to the bell crank 13 and is pivotally attached at its outer end to this bell crank, as shown at 28. Thus the bell crank 13 will be rotated about its mounting pin 14 when the power cylinder 25 is actuated. When the bell crank 13 is thus moved it will pull downwardly on the push rod 17 and push upwardly on the rod 22, thus operating the bell cranks 15 and 20 respectively to pivot the jaws 6 and 8 inwardly about their respective pivot pins 12, and simultaneously the bell crank 13 will pivot the jaw 7 around its pivot pin 12, thus simultaneously moving each of the jaws inwardly to engage and grip the pipe 1.

In Operation

The pipe 1 is first positioned in the plate 4 and within the recess 5 of that plate, and is supported in a horizontal position to be cut or trimmed by the pipe cutting and shaping machine of which the frame 2 is a part. Once the pipe 1 has been loaded into the machine the jaws 6, 7, and 8 are pressed inwardly against the pipe to hold the same securely in position. The jaws 6, 7, and 8 have previously been properly adjusted by moving them inwardly or outwardly on their respective pivot pins 12, this adjustment being accomplished by first removing the pins 18, 23, and 24. When the jaws 6, 7, and 8 have each been properly adjusted in a radial direction, the pins 18, 23, and 24 are reinserted; the spaced holes 19 in the arm 10 of each of the jaws permits the proper aligning of these jaws. The power cylinder 25 is now actuated and this pushes the rod 27 outwardly which swings the bell crank 13 on its pivot 14, thus actuating the bell cranks 15 and 20 through the push rods 17 and 22 respectively, thereby simultaneously moving the jaws 6, 7, and 8 inwardly to engage and grip the pipe 1.

Having described our invention, I claim:

1. A pipe clamp for trimming machines comprising a carriage, a plate extending vertically above the carriage, said plate having an arcuate recess to receive a pipe therein, a plurality of jaws positioned adjacent the arcuate recess, a plurality of pivot pins extending from said plate, each of said jaws being pivotally mounted on one of the pins, a power cylinder, a bell crank pivotally mounted on the plate adjacent each of said jaws, one end of each bell crank being pivotally attached to one of the jaws, a pitman extending from the power cylinder to one of the bell cranks, and push rods extending from the last named bell crank to each of the other bell cranks on said plate.

2. A pipe clamp for trimming machines comprising a carriage, a plate extending vertically above the carriage, said plate having an arcuate recess to receive a pipe therein, a plurality of jaws positioned adjacent the arcuate recess, a plurality of pivot pins projecting from said plate, each of said jaws having a plurality of spaced notches therein to selectively fit over one of the pivot pins to pivotally mount the jaw, a power cylinder, a bell crank pivotally mounted on the plate adjacent each of said jaws, one end of each bell crank being pivotally attached to one of the jaws, a pitman extending from the power cylinder to one of the bell cranks, and push rods extending from the last named bell crank to each of the other bell cranks on said plate.

3. A pipe clamp for trimming machines comprising a carriage, a plate extending vertically above the carriage, said plate having an arcuate recess to receive a pipe therein, a plurality of jaws positioned adjacent the arcuate recess, a pivot pin projecting from the plate adjacent each of the jaws, each of the jaws being pivotally mounted on a pivot pin, a plurality of spaced notches on each of the jaws, the pivot pin for each jaw extending selectively into one of the notches, a power cylinder, a first bell crank adjacent one of the jaws, means pivotally mounting the first bell crank on the plate, a pitman extending from the power cylinder to one end of the first bell crank, the other end of said first bell crank being pivotally attached to the said one of the jaws, another bell crank adjacent each of the other of said jaws, and a push rod extending from the first bell crank to each of the other bell cranks to simultaneously rotate all of the bell cranks, one end of each of the other bell cranks being pivotally attached to a jaw.

4. A pipe clamp for trimming machines comprising a carriage, a plate extending vertically above the carriage, said plate having an arcuate recess to receive a pipe therein, a plurality of jaws positioned adjacent the arcuate recess, a pivot pin projecting from the plate adjacent each of the jaws, each of the jaws being pivotally mounted on a pivot pin, a plurality of spaced notches on each of the jaws, the pivot pin for each jaw extending selectively into one of the notches, a power cylinder, a first bell crank adjacent one of the jaws, means pivotally mounting the first bell crank on the plate, a pitman extending from the power cylinder to one end of the first bell crank, the other end of said first bell crank being pivotally attached to the said one of the jaws, another bell crank adjacent each of the other of said jaws, and a push rod extending from the first bell crank to each of the other bell cranks to simultaneously rotate all of the bell cranks, each of said jaws having a plurality of spaced holes therein, and a mounting pin extending through the adjacent bell crank and into one of said holes.

References Cited in the file of this patent

UNITED STATES PATENTS

| | | |
|---|---|---|
| 287,993 | Anderson | Nov. 6, 1883 |
| 1,603,307 | Anderson | Oct. 19, 1926 |
| 1,619,749 | Murray | Mar. 1, 1927 |
| 2,067,626 | Benninghoff | Jan. 12, 1937 |
| 2,148,208 | Lancaster | Feb. 21, 1939 |
| 2,341,602 | Dewey | Feb. 15, 1944 |
| 2,655,670 | Eyler | Oct. 20, 1953 |
| 2,798,234 | Benninghoff et al. | July 9, 1957 |
| 2,811,771 | Ericsson | Nov. 5, 1957 |

FOREIGN PATENTS

| | | |
|---|---|---|
| 23,544 | Great Britain | Dec. 4, 1894 |
| 24,434 | Austria | June 11, 1906 |